United States Patent [19]
Kendall

[11] Patent Number: 5,671,819
[45] Date of Patent: Sep. 30, 1997

[54] AXLE TENSIONER FOR BANDED TIRES

[75] Inventor: Donald H. Kendall, Almont, Mich.

[73] Assignee: The United States of America as represented by the Secretary of the Army, Washington, D.C.

[21] Appl. No.: 443,913

[22] Filed: May 22, 1995

[51] Int. Cl.[6] .................................................. B62D 55/30
[52] U.S. Cl. ........................ 180/9.1; 180/9.48; 305/116; 305/154
[58] Field of Search ........................ 280/638, 38; 180/9.1, 180/9.26, 9.4, 9.48; 305/116, 153, 154, 143

[56] References Cited

U.S. PATENT DOCUMENTS

| | | |
|---|---|---|
| 2,309,793 | 2/1943 | Sedore et al. ............... 305/154 |
| 2,314,295 | 3/1943 | Wampfler ..................... 305/154 |
| 2,998,998 | 9/1961 | Hyler et al. ................... 180/9.1 |
| 4,405,026 | 9/1983 | Merrifield ..................... 305/116 |
| 5,409,305 | 4/1995 | Nagorcka ...................... 305/153 |

*Primary Examiner*—Anne Marie Boehler
*Attorney, Agent, or Firm*—Peter A. Taucher; Gail S. Soderling

[57] ABSTRACT

An improved tire tensioning system for use with flexible band tracks mounted on dual tire sets is disclosed. The tensioning system includes first and second tensioning bars which each have one threaded end connected to a turnbuckle and a second end connected to block fixed to a respective front or rear wheel axle by a ball coupling. Also shown is an improved axle structure which can be used to adjust the toe in/out of the rear tire sets.

2 Claims, 4 Drawing Sheets

5,671,819

AXLE TENSIONER FOR BANDED TIRES

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to tracked type motive means. In a further aspect, this invention relates to banded tandem tire sets useful with land vehicles and trailers.

2. Prior Art

Many high capacity vehicles and trailers have tandem dual wheels where two sets of side by side dual wheels are mounted on separate axles in a front-back configuration on each side of the vehicle. When the vehicle is to be used over soft soils or on off road terrain the wheels have a tendency to dig or sink in to the soil disabling the vehicle.

It would be desirable to have the ability to place an elastomeric band about adjacent pairs of tandem tire sets to provide a larger foot print less subject to becoming mired in the soil and providing a better driving force for the vehicle. With trailers such a band could prevent the trailer from becoming stuck.

Such bands have been used in the past. However, the suspension mounting systems have certain deficiencies. First the tension used to mount the band on the tandem tire sets is important since too much tension will create excessive heat and wear in the tread. Too little tension will allow the band to come off the tire sets making the device useless. Also, the axial alignment of the tires is important since misalignment will cause the band to move off the tandem tire sets either into the vehicle frame causing damage or off the tire set requiring the band to be replaced on the tire sets. In military vehicles reliability is particularly important.

BRIEF SUMMARY OF THE INVENTION

Problems of the prior art suspension systems are ameliorated by the suspension system of the present invention. The invention is designed as a tensioning and alignment structure useful for mounting a flexible band track on a tandem tire configuration. The inner surface of the flexible band track mounted on the tires has a plurality of guide blocks located along and forming a longitudinal axis for the flexible band. The guide blocks extend inward from the inner surface of the flexible track and travel between the tires of a set as the band rotates during tire rotation.

The flexible band used with the present suspension system is mounted on a pair of complimentary tandem forward-rear dual tire sets. The band is mounted on the forward-rear dual tire set so the guide blocks are disposed between the tires on each dual tire set causing the guide blocks to track between the tires thereby maintaining the flexible band on the tires and longitudinally oriented with respect to the vehicle axis.

There is a forward dual tire set mounted on each side of the vehicle. The forward tire sets are mounted on a front axle mounted transversely across the vehicle.

The rear tire sets are mounted on a rear alignment adjuster axle that has several parts. A first tire support bar has a first end adapted to hold one of the rear tire sets and a second end located near the midline of the supported structure and having an adjustment means mounted thereon. The first tire support bar is attached to the vehicle by means of a suspension system such as a leaf spring.

A second tire support bar has a first end adapted to hold the other rear dual tire set and a second end located near the midline of the supported structure, the second end having an adjustment means mounted thereon. The second tire bar is also attached to the vehicle by means of a suspension system.

The adjuster axle has a support bar transversely mounted on and attached to the vehicle frame. One end of the support bar is hinged to the first tire support bar near its mid point and the other end of the support bar is hinged to the second support bar near its midpoint. The support bar lies juxtaposed and alongside the first and second tire support bars. The support bar has reaction means to cooperate with the adjustment means located on the second ends of the first and second bars to provide a reactive force that will adjust the toe in/out camber of the rear tire set relative to its complimentary front tire. This aligns the rear tire set to with its complimentary front tire set located on the same side of the vehicle to minimize the chance of the belt riding off the tires.

Each front-rear dual tire set is axially, longitudinally aligned and the guide blocks of the flexible band are located and spaced on the inner surface of the flexible band in such a configuration as to be disposed between the adjacent tires of an individual tire set. This will provide band alignment to the structure.

A tensioning system is associated with the axles one tensioning member being located on each side of the vehicle. The tensioning member includes a first tensioning bar with its axle engaging end attached to a first axle block mounted on the front axle by means of a flexible ball joint coupling and a threaded adjustment end engaged with a complimentarily threaded turnbuckle. The axle block is rigidly mounted to the forward axle and a spring seat is rotatably mounted to the axle block. The spring seat is adapted to hold one end of a leaf spring attached to the vehicle being supported.

A second tensioning bar has its axle end attached to the rear axle at a second axle block by means of a flexible ball joint coupling, the second bar having a threaded adjustment end engaged with the complimentarily threaded turnbuckle. The second axle block is rigidly mounted to the rear axle and has a second spring seat rotatably mounted thereon the second spring seat being adapted to hold the other end of the leaf spring.

The turnbuckle can be rotated allowing the effective combined length of the tensioning member to be changed to shorten the distance between the tire sets so as to allow the flexible band to be mounted on the tandem tires sets with the guide blocks between adjacent tires and then lengthened so as to increase the distance between the axles and create sufficient tension to hold the flexible band in position.

DETAILED DESCRIPTION OF PREFERRED EMBODIMENTS

Figure 1:
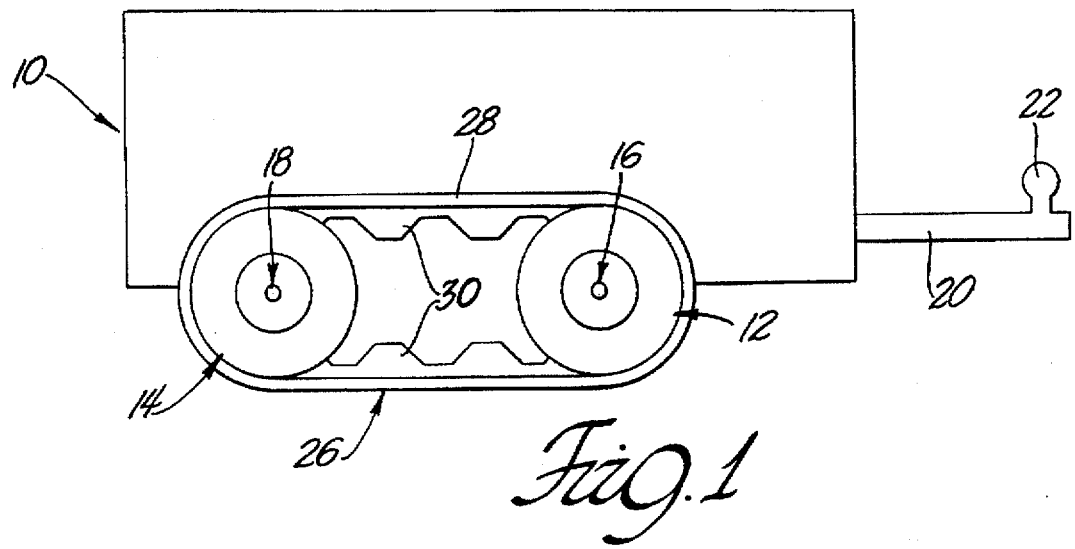
FIG. 1 is a side view of a trailer with a flexible band placed on the dual tire sets in accordance with this invention.

Referring to the accompanying drawing and initially FIG. 1, A trailer designated generally 10 is shown with a front dual tire set generally 12 and a rear dual tire set 14 mounted on axles 16, 18 respectively. The trailer 10 shown is generic and has a tow bar 20 with associated attachment means 22 for engagement with a complimentary hitch on a towing vehicle, not shown. The trailer 10 has a cargo box 24 supported on springs, not shown in this figure. The front dual tire set 12 and rear dual tire set 14 have a flexible band 26 disposed about the tire sets forming a flexible track system. The flexible band 26 has a flat surface 28 that extends transversely across the tire sets forming an ovoid shaped flat annulus. The flexible band 26 will provide a relatively broad foot print for the trailer 10. A plurality of guide blocks 30, which are shaped projections are disposed along the midline of the flexible band 26 and extend into the center of the flat annulus formed by the flat portion 28 of the band. The guide blocks 30 will pass between the outer tire 12a and inner tire 12b of the front tire set and the outer tire 14a and inner tire 14b of the rear set. When the band 26 is properly aligned and tensioned, the guide blocks 30 will serve to hold the flexible belt in position during use.

Figure 2:
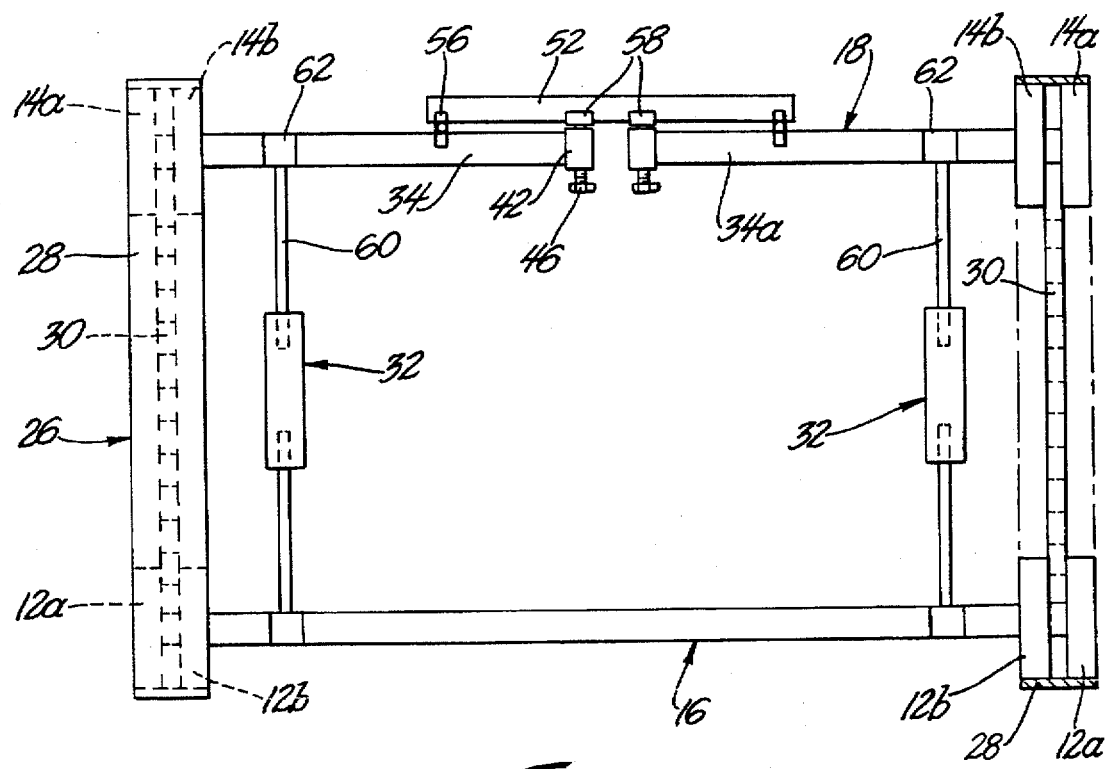
FIG. 2 is a top view of an axle structure for use in this invention.

The overall belt, tire, tensioner and axle configuration is shown best in FIG. 2. In this FIG. the body system has been removed to ensure rarity. The front axle 16 extends transversely across the structure and has a wheel mounting means for mounting a dual tire wheel set on each end of the axle 16. The mounting structure will vary with the vehicle and its size the mountings being well known in the art. The tire sets are mounted on dual tire wheels of the kind commercially available from number of different sources. The tires 12a, 12b are mounted on the wheels in pairs and installed and removed as a set.

The rear tire sets are mounted on the adjustable axle 18 extending transversely across the vehicle which has a wheel mounting means for mounting a dual tire wheel set 14 on each end of the axle 18. The mounting structure will vary with the vehicle and its size the mountings being chosen to hold the tire in an individual set at the same spacing as the front tire sets 12. The tire sets are also mounted on dual tire wheels commercially available from a number of different sources. The tires 14a, 14b are mounted on the wheels in pairs and installed and removed as a set.

Two adjustable tensioners 32 are mounted longitudinally between the axles 16, 18 one tensioner being located on each side of the vehicle's's midline. The tensioners 32 can be shortened to allow the flexible belt to be slipped over complimentary tire sets and the guide blocks 30 positioned between the inner and outer tires. Once in place, the tensioner 32 can be lengthened to exert a tension on the complimentary tires and hold the flexible belt in place. The tensioners should have a total length change of about 4" to 6" to provide adequate changes in tire spacing to allow easy installation of the flexible belt on the tire sets. The degree of change necessary may vary based on the size of the tires on the tire sets and the distance between the tires of each set.

Figure 3:
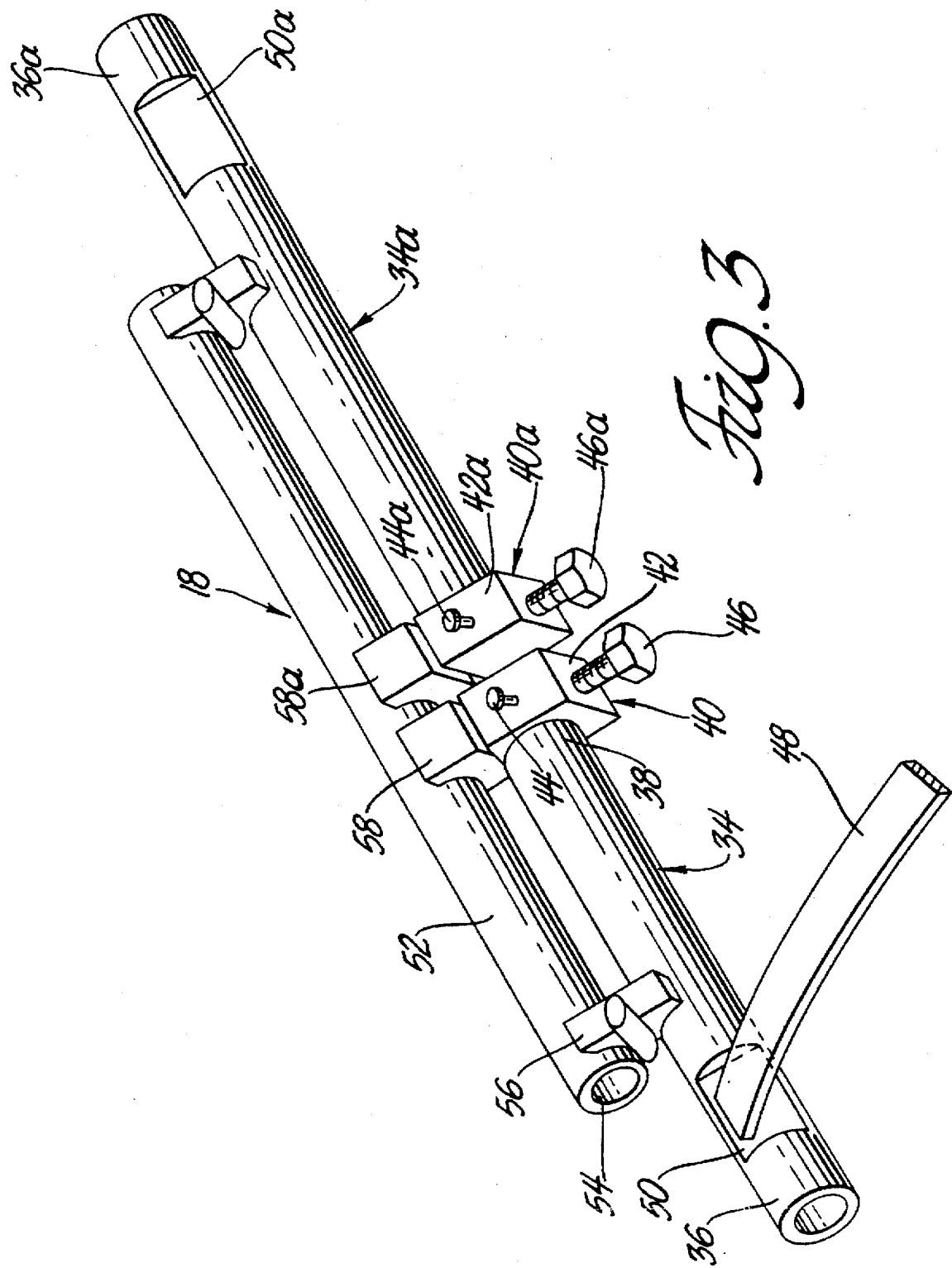
FIG. 3 is a perspective view of the adjuster axle associated with the rear tire sets.

Referring to FIG. 3, the adjuster axle 18 comprises several parts. A first tire support bar 34 mounted transversely with respect to the vehicle has a first end 36 adapted to hold one of the rear tire sets (not shown) and a second end 38 located near the midline of the vehicle. The second end 38 has an adjustment means 40 comprising a block 42 mounted on the second, inner end 38 of the tire support bar 34. The block 42 is held in place by a set screw 44 which serves to hold the block in place and a threaded aperture is formed through block 40 to allow a complimentary threaded adjusting screw 46 to be moved perpendicular to the tire bar to adjust toe in toe out of the rear tire set. The first tire support bar 34 is attached to the vehicle by means of a suspension system such as a leaf spring 48 which has one end attached to the tire bar 34 by means of a mounting 50. Such mountings are known in the art.

A second tire support bar 34a mounted transversely with respect to the vehicle has a first end 36a adapted to hold the other rear tire set (not shown) and a second end 38a located near the midline of the vehicle. The second end 38a also has an adjustment means 40a comprising a block 42a mounted on the second inner end 38a of the second tire support bar 34a. The block 42a is held in place by a set screw 44a which serves to hold the block in place and a threaded aperture is formed through block 40a to allow a complimentary threaded adjusting screw 46a to be moved perpendicular to the tire bar 34a to adjust toe in toe out. The second tire support bar 34a is attached to the vehicle by means of the suspension system shown as a second leaf spring 48a which has one end attached to the second tire bar 34a by means of a mounting 50a.

The adjuster axle 18 has a support bar 52 transversely mounted with respect to the vehicle frame. A first end 54 of the support bar 52 is attached to the first tire support bar 34 near its mid point by means of a hinge 56 and the second end 54a of the support bar is hinged to the second tire support bar near its midpoint. The support bar lies juxtaposed to, in front of and parallel to the first and second tire support bars 34, 34a. The support bar 52 has reaction pads 58, 58a mounted on juxtaposed blocks 40, 40a respectively. When the screws 46, 46a are adjusted they can be used to apply a force to the reaction pad which turn causes the ends 36, 36a on the outer end of the tire support bars 34, 34a to toe in or out depending on the direction the screw 46 is moved. This will adjust the toe in/out camber of the front tire set relative to its complimentary rear tire. This aligns the rear tire set with its complimentary front tire set located on the same side of the vehicle.

Figure 4:
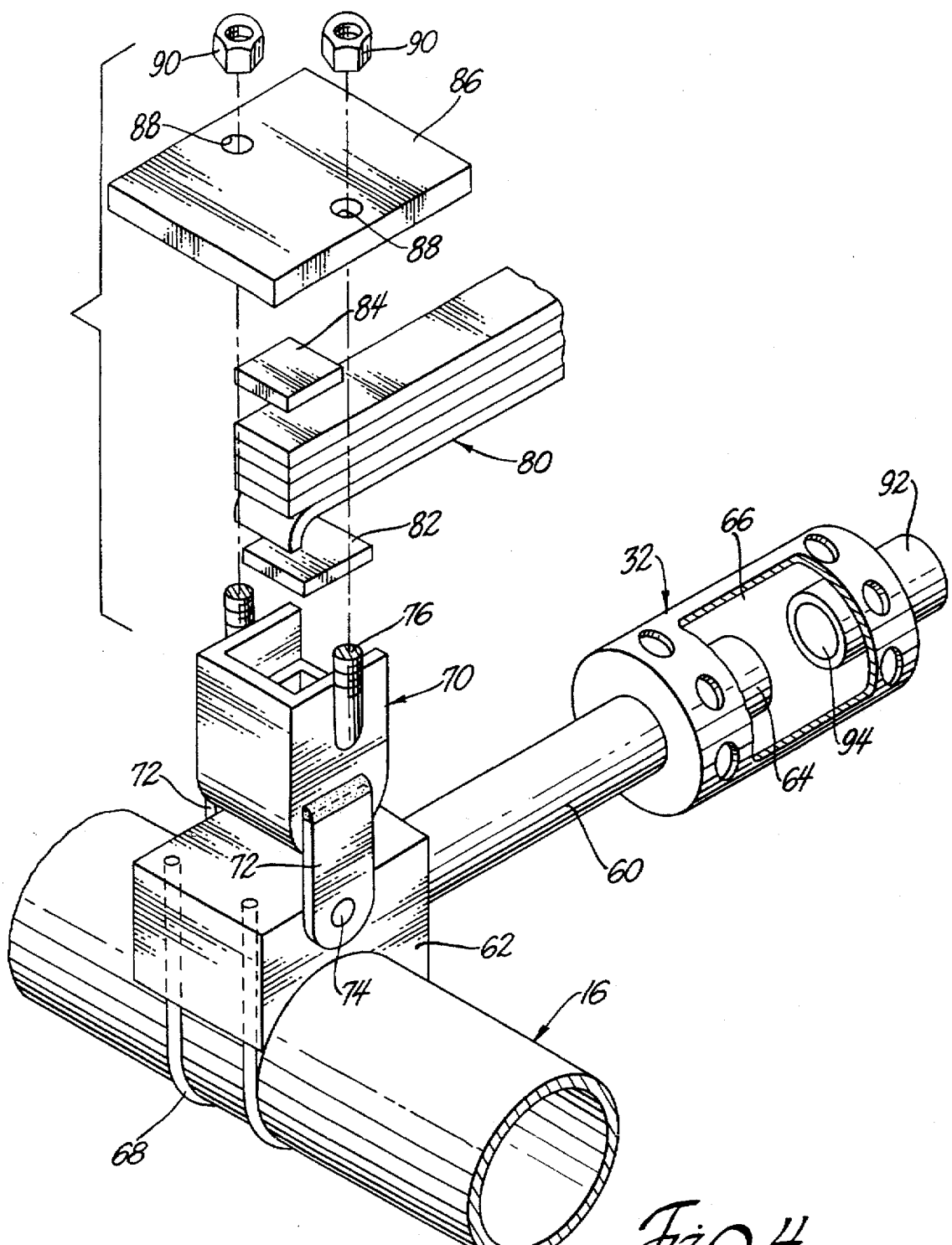
FIG. 4 is a perspective view of the tensioning member showing the axle block and associated spring seat.
Figure 5:
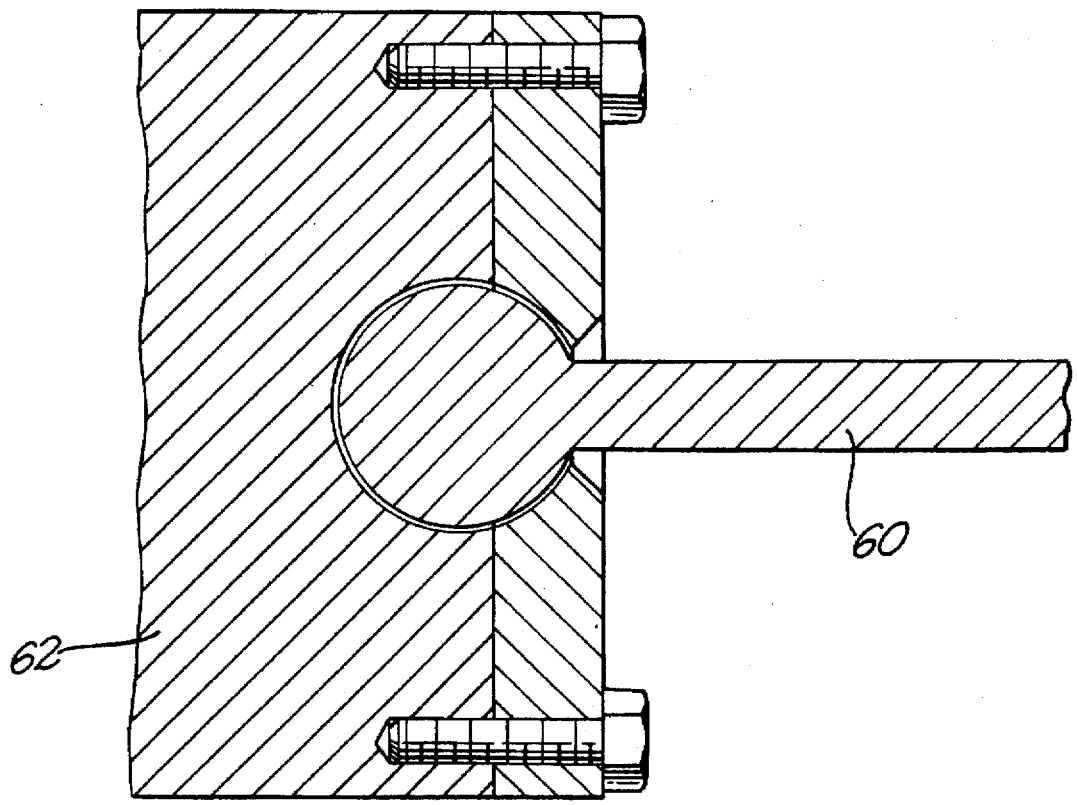
FIG. 5 is a sectional view of an attachment means to attach a tensioner to an axle.

The tensioning member 32 along with a leaf spring mount is shown in greater detail in FIG. 4. There is one tensioning member 32 associated with the front axle 16 and rear axle 18 for each side of the vehicle. The tensioning member 16 includes a first tensioning bar 60 with its axle engaging end attached to a first axle block 62 by means of a flexible coupling, one example being the ball joint shown in FIG. 5 and described in greater detail hereinafter. The tensioning bar 60 has a threaded adjustment end 64 engaged with a complimentarily threaded turnbuckle 66. The axle block 62 is rigidly mounted to the axle 18, the rear axle being chosen for the purposes of illustrating this portion of the structure but a similar structure being used to fasten the other end of the tensioning member to the front axle 16. The mounting comprises a pair of "U" shaped clamps 68 surrounding the axle 18 the U shaped clamps having their ends securely anchored to the block 62.

A spring seat 70 is rotatably mounted to the block 62 by means of a yoke arrangement having two ears 72 with one end rigidly attached to the spring block 70 and the other end rotatably attached to the axle block 62 by means of pins 74 allowing the spring block two degrees of freedom in a plane perpendicular to the axle 18. The spring seat 70 has a recess formed in the upper portion with threaded studs 76 extending upward away from the body of the spring seat. The recess is adapted to hold one end of a leaf spring 80 attached to the vehicle being supported. An elastomeric pad 82 is placed in the recess and the end of the spring placed atop the pad within the recess and a second elastomeric pad 84 placed atop the leaf spring. A retention plate 86 having a pair of apertures 88 complimentary to the threaded studs 76 is placed over the second elastomeric pad 84 and the entire assembly consolidated by using the threaded nuts 90 which engage the studs 76.

The same construction is used to attach a second tensioning bar 92 to the front adjuster axle 16 and a threaded portion 94 of the second tensioning bar 92 is engaged by the turnbuckle 66 as described above.

The tensioning member 32 is adjusted by rotating the turnbuckle 66 drawing the ends 64, 94 of the tensioning bars closer or forcing them apart depending on the direction the turnbuckle is rotated. Rotation of the turnbuckle changes the length of the tensioning member shortening the distance between the tire sets so as to allow the flexible band to be mounted on the tandem tires sets with the guide blocks between adjacent tires and then lengthened so as to increase the distance between the axles and create sufficient tension to hold the flexible band in position.

Various modifications and alterations will become apparent to those skilled in the art with out departing from the scope and spirit of this invention and it is understood that this invention is not limited to the illustrative embodiments set forth above.

What is claimed is:

1. A tensioning structure for use in mounting a flexible band track having guide blocks on a tandem tire configuration of a vehicle, the vehicle having a pair of complimentary tandem forward-rear dual tire sets one forward-rear dual tire set being disposed on each side of the vehicle, each forward-rear dual tire set being axially, longitudinally aligned, the forward dual tire sets of the tandem forward-rear dual tire sets being mounted on a front axle and the rear tire sets of the tandem forward-rear dual tire sets being mounted on a rear axle, the guide blocks of the flexible band being located on the surface of the flexible band in contact with the dual tire sets and disposed between adjacent tires of an individual tire set to provide band alignment, the tensioning structure including a tensioning member having a first end attached to the front axle holding one of the forward tire sets, the tensioning structure having a first bar with its axle end attached to a first axle block by means of a flexible ball joint coupling and a threaded adjustment end engaged with a complimentarily threaded turnbuckle, the block being rigidly mounted to the forward axle, a spring seat rotatably mounted to the block, the spring seat being adapted to hold a leaf spring attached to the vehicle, a second bar having its axle end attached to the rear axle at a second axle block by means of a flexible ball joint coupling, the second bar having a threaded adjustment end engaged with the complimentarily threaded turnbuckle, the second axle block being mounted to the rear axle and being adapted to hold the other end of the leaf spring, the turnbuckle allowing the effective combined length of the tensioning bars to be changed so as to allow the flexible band to be mounted on the tandem tire sets with the guide blocks between adjacent tires and then lengthened so as to increase the distance between the axles and thereby create sufficient tension to hold the flexible band in position.

2. A tensioning structure for use in mounting a flexible band track having guide blocks on a tandem tire configuration of a vehicle, the vehicle having a pair of complimentary tandem forward-rear dual tire sets, one forward-rear dual tire set being disposed on each side of the vehicle, each forward-rear dual tire set being axially, longitudinally aligned, the forward dual tire sets of the tandem forward-rear dual tire sets being mounted on a front axle; the rear tire sets of the tandem forward-rear dual tire sets being mounted on a rear adjuster axle, the rear adjuster axle having a first tire support bar, the first tire support bar having a first end adapted to hold one of the rear tire sets and a second end located near the midline of the vehicle and having an adjustment means mounted thereon, a second tire support bar having a first end adapted to hold the other rear dual tire set and a second end located near the midline of the vehicle and having an adjustment means mounted thereon, a support bar mounted transversely with respect to the vehicle, one end of the support bar being hinged to the first tire support bar near its midpoint and the other end of the support bar being hinged to the second tire support bar near its midpoint the support bar lying juxtaposed the first and second tire support bars and having means to cooperate with the adjustment means located on the first and second bars to provide a reactive force which will adjust the toe in/out of the rear tire set relative to its complimentary front tire set to align it individually with the rear tire set located on the same side of the vehicle axle and the rear dual tire sets being mounted on a rear axle, the guide blocks of the flexible band being located on the surface of the flexible band in contact with the dual tire set and disposed between adjacent tires of an individual tire set to provide band alignment, the tensioning structure including a tensioning member having a first end attached to a first axle block by means of a flexible ball joint coupling and a threaded adjustment end engaged with a complimentarily threaded turnbuckle, the block being rigidly mounted to the forward axle, a spring attached to the vehicle being supported, a second bar having its axle end attached to the rear axle at a second axle block by means of a flexible ball joint coupling, the second bar having a threaded adjustment end engaged with the complimentarily threaded turnbuckle, the second axle block being rigidly mounted to the rear axle and being adapted to hold the other end of the leaf spring, the turnbuckle allowing the effective combined length of the tensioning bars to be changed so as to allow the flexible band to be mounted on the tandem tires sets with the guide blocks between adjacent tires and then lengthened so as to increase the distance between the axles and thereby create sufficient tension to hold the flexible band in position.

\* \* \* \* \*